US011428401B2

(12) United States Patent
Edwards (10) Patent No.: US 11,428,401 B2
(45) Date of Patent: Aug. 30, 2022

(54) ILLUMINATED WALL-MOUNT HARDWARE ASSEMBLY (71) Applicant: LIBERTY HARDWARE MFG. CORP., Winston-Salem, NC (US)

(72) Inventor: Neil Edwards, Kernersville, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 130 days.

(21) Appl. No.: 16/887,377

(22) Filed: May 29, 2020

(65) Prior Publication Data

US 2020/0378591 A1 Dec. 3, 2020

Related U.S. Application Data (60) Provisional application No. 62/855,383, filed on May 31, 2019.

(51) Int. Cl.
F21V 33/00 (2006.01)
F21V 23/00 (2015.01)
F21V 23/04 (2006.01)
F21S 9/02 (2006.01)
H05B 47/16 (2020.01)
A47K 10/38 (2006.01)
F21S 8/00 (2006.01)
F21Y 115/10 (2016.01)

(52) U.S. Cl.
CPC ............ F21V 33/004 (2013.01); A47K 10/38 (2013.01); F21S 8/036 (2013.01); F21S 9/02 (2013.01); F21V 23/009 (2013.01); F21V 23/04 (2013.01); H05B 47/16 (2020.01); F21Y 2115/10 (2016.08)

(58) Field of Classification Search
CPC ...... F21V 33/004; F21V 23/009; F21V 23/04; F21V 23/0464; A47K 10/38; A47K 2010/389; A47K 10/32; A47K 10/16; A47K 10/18; F21S 8/036; F21S 9/02; H05B 47/16; F21Y 2115/10; Y02B 20/40
See application file for complete search history.

(56) References Cited

U.S. PATENT DOCUMENTS 1,778,856 A * 10/1930 Hoegger ................ A47K 10/22
242/565
D216,458 S * 1/1970 Nestrock ........................ D8/363
4,367,517 A * 1/1983 Balzer ................. E04F 11/1804
362/146
5,450,299 A 9/1995 Lepre
D419,012 S 1/2000 Wiggins, Jr.
6,135,621 A * 10/2000 Bach ...................... E05B 17/10
16/110.1

(Continued)

FOREIGN PATENT DOCUMENTS

CN 202908345 U 5/2013
CN 303311737 S 3/2015

(Continued)

Primary Examiner — Ko H Chan
(74) Attorney, Agent, or Firm — Brooks Kushman P.C.; Lora Graentzdoerffer (57) ABSTRACT A wall-mount hardware assembly is provided with a base adapted to be mounted to an upright support surface. A post is connected to the base. A lighting assembly is installed in the post to illuminate an underlying region. A bar extends from the post to support an article. A power source is disposed within the bar.

20 Claims, 3 Drawing Sheets (56) References Cited

U.S. PATENT DOCUMENTS

| | | | |
|---|---|---|---|
| 6,199,808 B1* | 3/2001 | Lin | A47K 10/10 |
| | | | 211/105 |
| 6,672,552 B1 | 1/2004 | Jao | |
| 6,676,278 B2 | 1/2004 | Striebel et al. | |
| 7,052,170 B2 | 5/2006 | Striebel | |
| 7,168,843 B2 | 1/2007 | Striebel | |
| 7,434,960 B2 | 10/2008 | Stuhlmacher, II et al. | |
| 7,832,890 B2 | 11/2010 | Jesse | |
| 7,901,115 B2 | 3/2011 | Chien | |
| 8,206,003 B1 | 6/2012 | LaBarge | |
| 8,210,705 B2* | 7/2012 | Pesson | E04F 11/1836 |
| | | | 362/146 |
| 8,789,788 B2* | 7/2014 | Edmonds | A47K 10/00 |
| | | | 242/598.2 |
| 9,383,091 B1 | 7/2016 | Greco | |
| 9,772,078 B2 | 9/2017 | Suggs | |
| D848,241 S | 5/2019 | Meyers et al. | |
| 2003/0189127 A1 | 10/2003 | Arendt et al. | |
| 2004/0160775 A1* | 8/2004 | Goodlett | F21V 33/004 |
| | | | 362/253 |
| 2004/0178300 A1 | 9/2004 | Goodlett et al. | |
| 2008/0030981 A1* | 2/2008 | Mrakovich | F21S 4/28 |
| | | | 362/219 |
| 2008/0080173 A1* | 4/2008 | Trimble | F21S 4/20 |
| | | | 362/146 |
| 2008/0184475 A1 | 8/2008 | Sladick et al. | |
| 2010/0315023 A1 | 12/2010 | Pesson et al. | |
| 2011/0283577 A1 | 11/2011 | Cornelissen et al. | |
| 2014/0076508 A1* | 3/2014 | Mullet | E06B 9/40 |
| | | | 160/310 |
| 2017/0112334 A1 | 4/2017 | Holland | |
| 2017/0343205 A1 | 11/2017 | Heuer et al. | |
| 2018/0099610 A1 | 4/2018 | Meyers | |
| 2018/0146830 A9 | 5/2018 | Yocom et al. | |

FOREIGN PATENT DOCUMENTS

| | | |
|---|---|---|
| DE | 102007048099 A1 | 4/2009 |
| DE | 202010015184 U1 | 4/2011 |
| DE | 202017105448 U1 | 10/2017 |
| IN | 0261DE2015 | 8/2015 |
| TW | M421084 U | 1/2012 |
| TW | M423189 U | 2/2012 |
| WO | 2006004564 A1 | 1/2006 |

* cited by examiner

ILLUMINATED WALL-MOUNT HARDWARE ASSEMBLY

CROSS-REFERENCE TO RELATED APPLICATIONS

This application claims the benefit of U.S. provisional application Ser. No. 62/855,383 filed May 31, 2019, the disclosure of which is hereby incorporated in its entirety by reference herein.

SUMMARY

According to an embodiment, a wall-mount hardware assembly is provided with a base adapted to be mounted to an upright support surface. A post is connected to the base. A lighting assembly is installed in the post to illuminate an underlying region. A bar extends from the post to support an article. A power source is disposed within the bar.

According to a further embodiment, the base further provides a pair of spaced apart bases, each adapted to be mounted to the upright support surface.

According to an even further embodiment, the post is further provided a pair of posts, each connected to one of the pair of spaced apart bases. The bar extends between, and is supported by, the pair of posts.

According to another even further embodiment, one of the pair of posts is stationary relative to the connected base. One of the pair of posts is pivotally attached to the connected base. The lighting assembly is installed in the pivotal post.

According to another even further embodiment, bar is affixed to the pivotal post to pivot with the pivotal post.

According to another even further embodiment, an abutment projection extends from the stationary post to receive and support the bar.

According to another even further embodiment, a frame is oriented within the pivotal post to support the lighting assembly.

According to another further embodiment, the frame is fastened to the base to pivot relative to the base. The frame is fastened to the pivotal post to pivot with the pivotal post.

According to another even further embodiment, the frame further provides a slotted bracket. The lighting assembly includes a circuit board received within the slotted bracket.

According to another even further embodiment, the lighting assembly further includes a light emitting diode mounted to the circuit board.

According to another further embodiment, each of the pair of spaced apart bases is formed with a cavity for receipt of a bracket fastened to the upright support surface.

According to another further embodiment, a controller is in electrical communication with the lighting assembly to operate the lighting assembly.

According to another even further embodiment, the controller is programmed with a timer to operate the lighting assembly.

According to another further embodiment, an egress aperture is formed in the post to permit the lighting assembly to illuminate the underlying region.

According to another further embodiment, the power source further provides a pair of axial aligned batteries disposed within a hollow cavity in the bar.

According to another further embodiment, the bar is sized to receive and support a roll of toilet paper.

According to another embodiment, a wall-mount hardware assembly is provided with a first base and a spaced apart second base, each of the first and second bases are adapted to be mounted to an upright support surface. A stationary post is connected to the first base. A cradle is pivotally connected to the second base. A lighting assembly is installed on the cradle to illuminate an underlying region. A pivotal post is attached to the cradle to conceal the lighting assembly and to pivot with the cradle relative to the second base. A bar is affixed to the pivotal post to pivot with the pivotal post and the cradle, and to extend to the stationary post to support an article between the stationary post and the pivotal post. A power source disposed within the bar.

According to a further embodiment, the cradle further provides a slotted bracket. The lighting assembly further provides a circuit board received within the slotted bracket.

According to an even further embodiment, the lighting assembly further provides a light emitting diode mounted to the circuit board.

According to a further embodiment, a wall-mount toilet paper assembly is provided with a first base and a spaced apart second base. Each of the first and second bases are adapted to be mounted to an upright support surface. A stationary post is connected to the first base. A cradle is pivotally connected to the second base. A slotted bracket extends from the cradle. A circuit board is received within the slotted bracket. A light emitting diode is mounted to the circuit board. A pivotal post is attached to the cradle to conceal the circuit board, the light emitting diode, and the cradle, and to pivot with the cradle relative to the second base. An egress aperture is formed in the pivotal post to permit the light emitting diode to illuminate an underlying region. A bar is affixed to the pivotal post to pivot with the pivotal post and the cradle, and extends to the stationary post to support a roll of toilet paper between the stationary post and the pivotal post and spaced apart from the upright support surface. The bar has a hollow cavity formed therein. An abutment projection extends from the stationary post to receive and support the bar. A pair of axially aligned batteries is disposed within the hollow cavity of the bar and in electrical communication with the circuit board to power the light emitting diode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An illuminated wall-mount hardware assembly is illustrated in FIGS. 1-4 as a toilet paper holder assembly and is referenced generally by reference numeral 10. The toilet paper holder assembly 10 is utilized to support an article, such as a roll of toilet paper from an upright support surface or wall 12. The toilet paper holder assembly 10 provides illumination to add accent lighting or night lighting to an associated environment, such as a bathroom. Although a toilet paper holder assembly 10 is illustrated and described, other wall-mount hardware assemblies may be employed, such as standard bathroom accessories, including towel bars, towel rings, shelves, clothing hooks, and the like.

Figure 3:
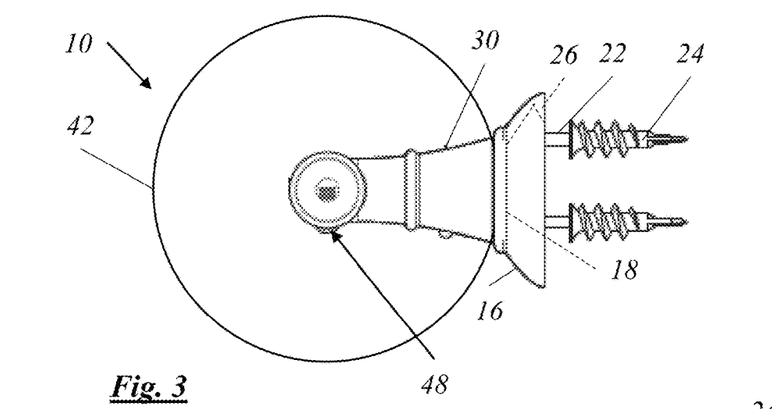
FIG. 3 is a right side elevation view of the toilet paper holder assembly of FIG. 1.
Figure 4:
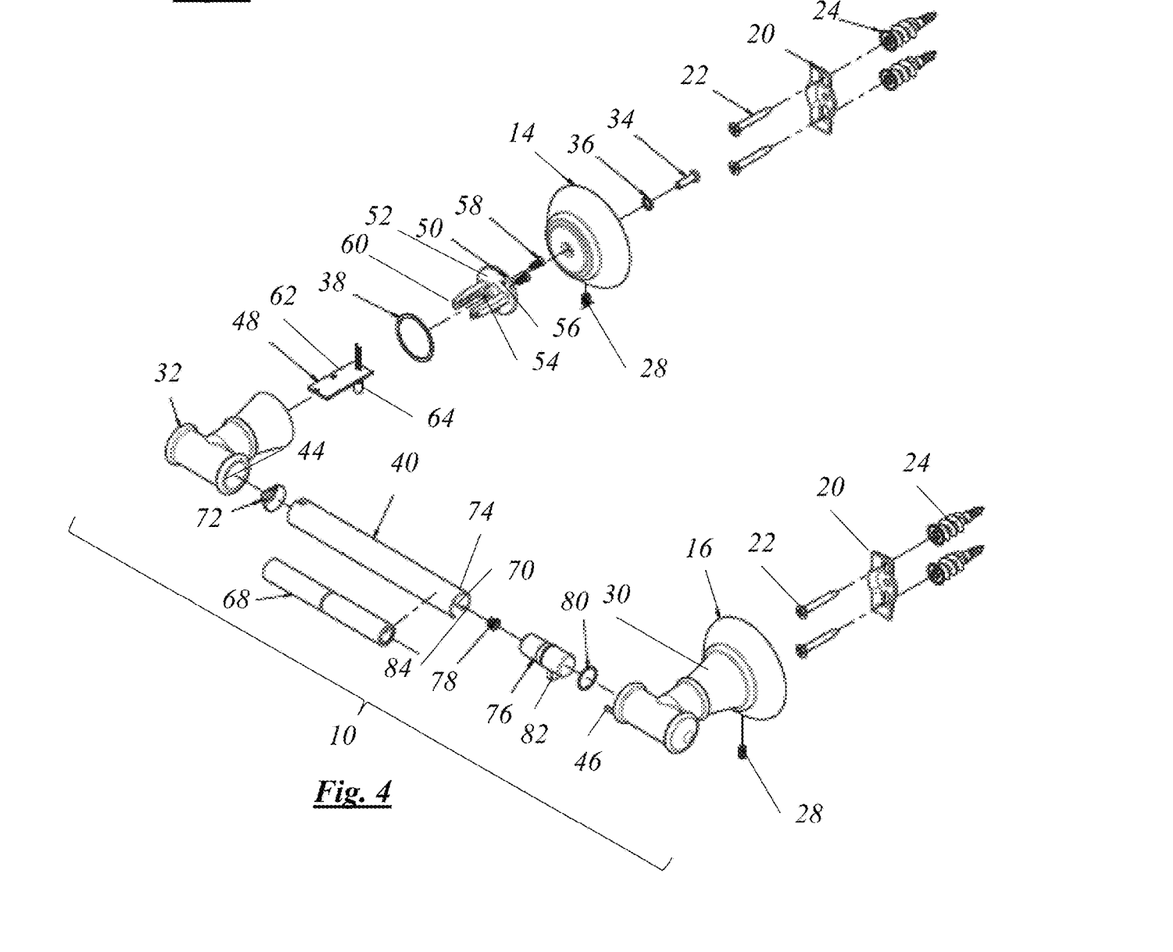
FIG. 4 is a top, front exploded perspective view of the toilet paper holder assembly of FIG. 1.

The toilet paper holder assembly 10 includes at least one, or a pair of bases 14, 16 for mounting the toilet paper holder assembly 10 to the wall 12. Referring to FIG. 3, each base 14, 16, includes a cavity 18 for receipt of bracket 20. The brackets 20 are illustrated in FIG. 4 and are installed to the wall 12 by a pair of threaded fasteners or screws 22, which are mounted directly into the wall 12, or are installed into drywall anchors 24 in the wall 12. Once the brackets 20 are installed upon the wall 12, the bases 14, 16 are supported upon an upper end of the bracket 20 by a retainer 26 within the cavity 18 as illustrated in FIG. 3. Referring again to FIG. 4, the bases 14, 16 are each fastened to the brackets 20 by a threaded fastener or set screw 28 installed into a bottom of each base 14, 16.

The toilet paper holder assembly 10 is a pivotal toilet paper holder assembly 10. Accordingly, the toilet paper assembly 10 includes a stationary post 30 support by the base 16. According to at least one embodiment, the stationary post 30 is formed integrally and unitary with the base 16. The toilet paper assembly 10 also includes a pivotal post 32 pivotally attached to the base 14 by a threaded fastener or machine screw 34 (FIG. 4). The screw 34 extends through a washer 36, the base 14 and into the pivotal post 32. A gasket 38 may be provided between the pivotal post 32 and the base 14 to seal an engagement therebetween and to damp the rotation of the pivotal post 32 relative to the base 14.

The posts 30, 32 extend away from the wall 12 and collectively support a bar 40 for receipt of a hollow center of a toilet paper roll 42 (FIG. 3). The bar 40 is mounted into a receptacle 44 (FIG. 4) in the pivotal post 32. The bar 40 pivots with the pivotal post 32. An abutment projection 46 extends from the stationary post 30 to receive and support the bar 40 in a horizontal orientation, and to provide a limit to a range of rotation of the pivotal post 32. In order to replace the roll 42 of toilet paper, a user rotates the bar 40 away from the stationary post 30. Then the user removes and replaces the toilet paper roll 42 and pivots the bar 40 back into engagement with the abutment projection 46.

The toilet paper holder assembly 10 houses a lighting assembly 48 to illuminate an associated environment. Referring to FIG. 4, the toilet paper assembly 10 includes a frame, such as cradle 50 housed within the pivotal post 32. The cradle 50 includes a substrate 52 with an internally threaded center aperture 54 to receive the screw 34 for pivoting relative to the base 14. Another pair of apertures 56 are formed through the substrate 52 to receive a pair of threaded fasteners 58 that fasten the cradle 50 to the pivotal post 32, such that the pivotal post 32 pivots relative to the base 14 about the pivotal connection of the cradle 50 and the base 14.

Figure 1:
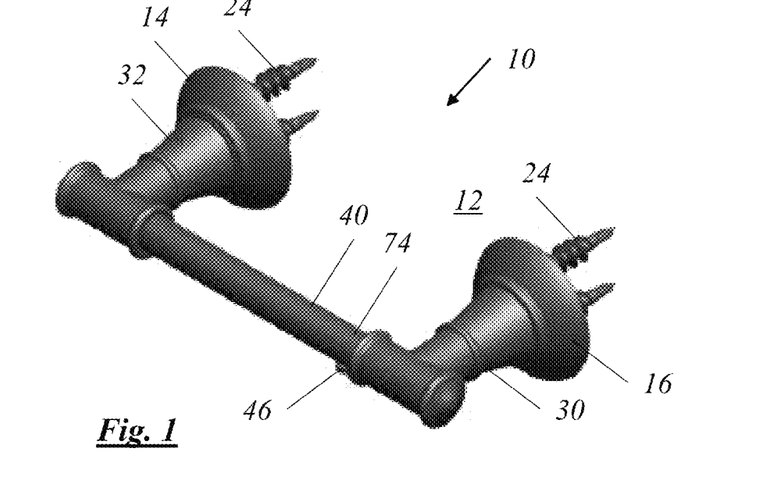
FIG. 1 is a top, front perspective view of an illuminated toilet paper holder assembly according to an embodiment.
Figure 2:
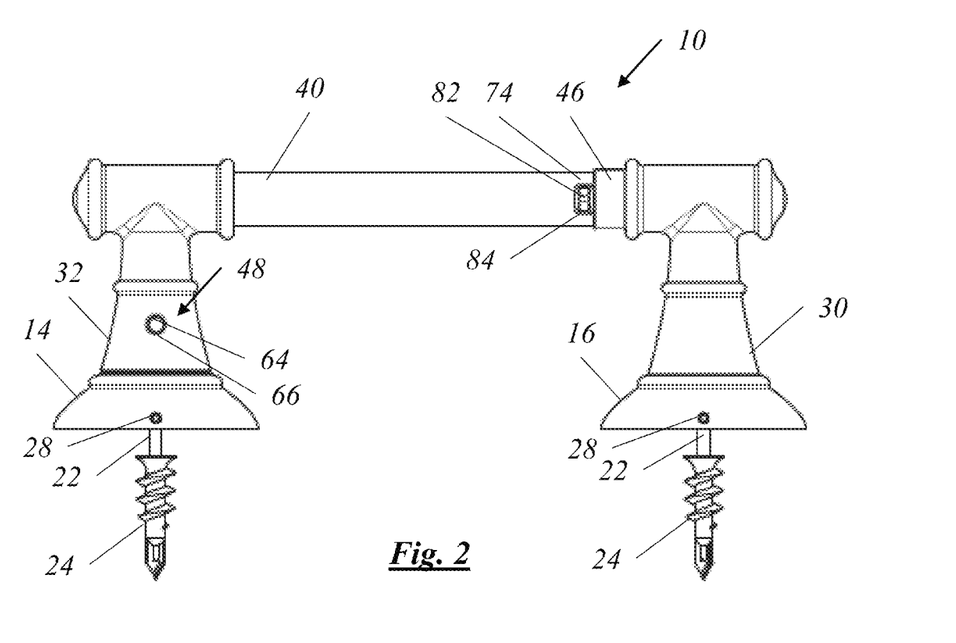
FIG. 2 is a bottom view of the toilet paper holder assembly of FIG. 1.

With continued reference to FIG. 4, the cradle 50 includes a pair of slotted brackets 60 to receive and support a printed circuit board (PCB) 62 of the lighting assembly 48. The circuit board 62 is oriented horizontally when the bar 40 is pivoted to the use position in contact with the abutment projection 46, which is also horizontal. At least one light source, such as a light emitting diode (LED) 64 is mounted to the circuit board 62. The LED 64 is oriented facing away from, and downward relative to, the circuit board 62. As illustrated in FIG. 2, an egress aperture 66 is formed in the pivotal post 32 to permit illumination for the LED 64 to pass to an underlying region.

FIG. 4 illustrates that a power source, such as a pair of axial aligned batteries 68 are disposed within a hollow cavity 70 in the bar 40. A power printed circuit board 72 is disposed within the receptacle 44 in the pivotal post 32. The batteries 68 are inserted into a distal end 74 of the bar 40 and slid so that one of the batteries 68 is in electrical contact with the power circuit board 72. An additional battery sleeve may be provided to house the batteries 68 within the bar 40 according to another embodiment.

An end cap 76 is provided as a sleeve to be inserted in the distal end 74 of the bar 40 to enclose the bar 40 and retain the batteries 68 in the bar 40. The end cap 76 includes an electrical contact spring 78, which is provided in electrical contact with batteries 68. An elastomeric ring, such as O-ring 80 is also provided on the end cap 76 to provide an interference fit within the opening 70 in the bar 40 to retain the batteries 68 within the bar 40 and to maintain electrical contact of the batteries 68 with the contact spring 78 and the power circuit board 72. The end cap 76 also includes a tab 82, which extends downward through a slot 84 in the bar 40. The tab 82 permits the user to grasp the tab 82 manually and remove the end cap 76 from the bar 40 for removal and replacement of the batteries 68.

The contact 78 and the power circuit board 72 are in electrical communication with the batteries 68 and the lighting circuit board 62 to power the LED 64. By providing the lighting assembly 48 in one of the posts 32 and the power source 68 in the bar 40, the toilet paper holder assembly 10 maintains overall dimensions associated with toilet paper holder assemblies 10. In other words, the compactness of the posts 30, 32 and the bar 40 are maintained to provide an appearance of a conventional toilet paper holder assembly 10. The posts 30, 32 and the bar 40 do not require enlargement, which may obfuscate or detract from the ornamental appearance, in order to provide illumination.

According to one embodiment, the lighting assembly 48 includes a light sensor (with a photo cell) in communication with the lighting circuit board 62. The light sensor detects the absence of ambient lighting, which is utilized by the circuit board 62 to determine a darkened environment, and consequently turn on the lighting to illuminate the underlying region in the dark.

According to another embodiment, the lighting assembly 48 includes a motion sensor in communication with the lighting circuit board 62. The motion sensor detects motion, and in response, the circuit board 62 illuminates the underlying region.

According to yet another embodiment, the lighting assembly 48 includes a motion sensor and a light sensor in electrical communication with the lighting circuit board 62. The light sensor is utilized to determine that the environment is dark, while the motion sensor is utilized to determine the presence of motion so that the underlying region is not always illuminated in the dark, but is illuminated in the dark after detection of motion.

According to another embodiment, the lighting assembly 48 includes a touch sensor, such as a capacitive touch sensor, so that the user can activate the lighting assembly 48 by manual contact with the one of the components, such as the pivotal post 32, of the toilet paper holder assembly 10.

According to another embodiment, a dimmer switch may be provided to regulate an intensity of the illumination.

According to another embodiment, the lighting assembly 48 may include a timer to control times at which the illumination is provided by the toilet paper assembly 10.

The illumination of the lighting assembly 48 can be employed as accent lighting or as a night light for guidance. Although a toilet paper holder assembly 10 is illustrated and described, the lighting assembly 48 may be installed and packaged within various bathroom accessories, such as towel bars, towel rings, shelving, clothing hooks and the like.

Figure 5:
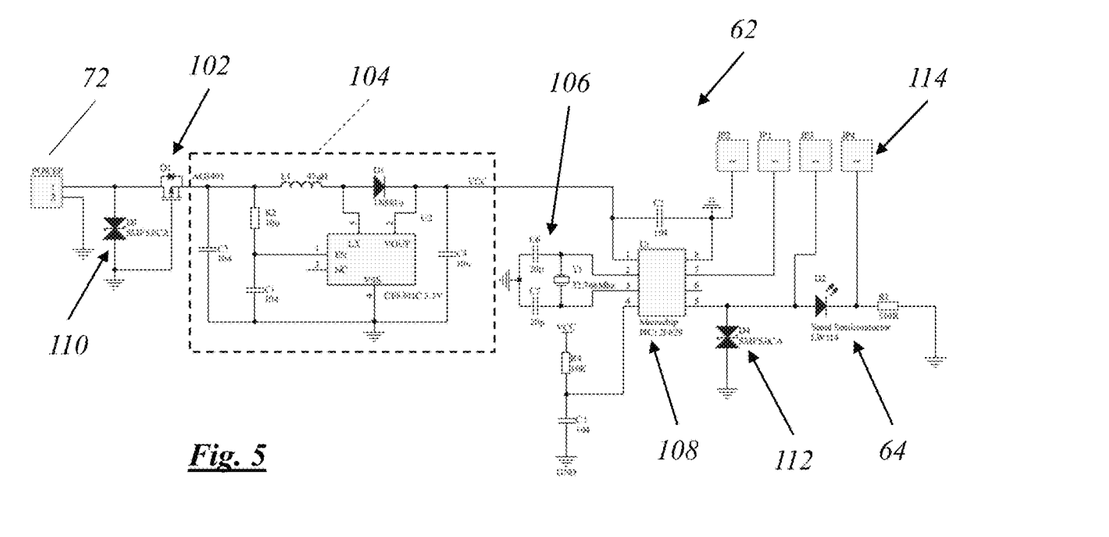
FIG. 5 is a schematic of a circuit diagram of the illuminated toilet paper holder of FIG. 1, according to an embodiment.

The toilet paper holder assembly 10 may include two replaceable batteries 68 that are stored within the bar 40, and that supply direct current power to the lighting assembly 48. The PCB 62 may include a p-channel metal-oxide-semiconductor field-effect transistor (MOSFET) 102 which may function as a switch to block negative current if the batteries 68 are improperly installed, such as in a reverse current direction.

The lighting assembly 48 includes a single LED 64, which may provide light at a constant brightness. The PCB 62 includes a microcontroller 108 that may drive a voltage boost circuit 104 to ensure the LED 64 receives constant output as the battery voltage drops, and the circuit is able to utilize the entire capacity of the batteries 68.

The lighting assembly 48 may power on the LED 64 based on a timer that is reset upon changing the batteries 68. The PCB 62 includes a crystal oscillator 106 that together with the microcontroller 108 creates an On/Off timer for activating the LED 64. The microcontroller 108 may turn the LED 64 on for a set period of time, e.g., 8 hours, then turn the LED off for 16 hours. The timer is reset by disconnecting the battery 68 from the PCB 62.

The PCB 62 may also include Zener diodes 110, 112 to prevent against electro-static discharge (ESD), and contact points 114 for end-of-line testing.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wall-mount hardware assembly comprising:
   a base adapted to be mounted to an upright support surface;
   a post connected to the base;
   a lighting assembly installed in the post to illuminate an underlying region;
   a bar extending from the post to support an article;
   a power source disposed within the bar;
   an end cap sized to be inserted in a distal end of the bar to enclose the bar and retain the power source in the bar; and
   a tab extending downward through a slot in the bar to permit a user to grasp the tab manually and remove the end cap from the bar for removal and replacement of the power source.

2. The wall-mount hardware assembly of claim 1 wherein the base further comprises a pair of spaced apart bases, each adapted to be mounted to the upright support surface.

3. The wall-mount hardware assembly of claim 2 wherein the post further comprises a pair of posts each connected to one of the pair of spaced apart bases; and
   wherein the bar extends between, and is supported by, the pair of posts.

4. The wall-mount hardware assembly of claim 3 wherein one of the pair of posts is stationary relative to the connected base;
   wherein one of the pair of posts is pivotally attached to the connected base; and
   wherein the lighting assembly is installed in the pivotal post.

5. The wall-mount hardware assembly of claim 4 wherein the bar is affixed to the pivotal post to pivot with the pivotal post.

6. The wall-mount hardware assembly of claim 5 further comprising an abutment projection extending from the stationary post to receive and support the bar.

7. The wall-mount hardware assembly of claim 5 further comprising a frame oriented within the pivotal post to support the lighting assembly.

8. The wall-mount hardware assembly of claim 7 wherein the frame is fastened to the base to pivot relative to the base; and
   wherein the frame is fastened to the pivotal post to pivot with the pivotal post.

9. The wall-mount hardware assembly of claim 7 wherein the frame further comprises a slotted bracket; and
   wherein the lighting assembly further comprises a circuit board received within the slotted bracket so that the frame, the lighting assembly, the pivotal post, the bar, the power source, and the circuit board collectively pivot together relative to the base.

10. The wall-mount hardware assembly of claim 9 wherein the lighting assembly further comprises a light emitting diode mounted to the circuit board.

11. The wall-mount hardware assembly of claim 2 wherein each of the pair of spaced apart bases is formed with a cavity for receipt of a bracket fastened to the upright support surface.

12. The wall-mount hardware assembly of claim 1 further comprising a controller in electrical communication with the lighting assembly to operate the lighting assembly.

13. The wall-mount hardware assembly of claim 12 wherein the controller is programmed with a timer to operate the lighting assembly.

14. The wall-mount hardware assembly of claim 1 wherein an egress aperture is formed in the post to permit the lighting assembly to illuminate the underlying region.

15. The wall-mount hardware assembly of claim 1 wherein the power source further comprises a pair of axial aligned batteries disposed within a hollow cavity in the bar.

16. The wall-mount hardware assembly of claim 1 wherein the bar is sized to receive and support a roll of toilet paper.

17. A wall-mount hardware assembly comprising:
   a first base and a spaced apart second base, each of the first and second bases adapted to be mounted to an upright support surface;
   a stationary post connected to the first base;
   a cradle pivotally connected to the second base;
   a lighting assembly installed on the cradle to illuminate an underlying region;
   a pivotal post attached to the cradle to conceal the lighting assembly and to pivot with the cradle relative to the second base;

a bar affixed to the pivotal post to pivot with the pivotal post and the cradle, and extending to the stationary post to support an article between the stationary post and the pivotal post; and a power source disposed within the bar;

wherein the cradle further comprises a slotted bracket; and wherein the lighting assembly further comprises a circuit board received within the slotted bracket so that the cradle, the lighting assembly, the pivotal post, the bar, the power source, and the circuit board collectively pivot together relative to the second base.

18. The wall-mount hardware assembly of claim 17 wherein the lighting assembly further comprises a light emitting diode mounted to the circuit board.

19. A wall-mount toilet paper assembly comprising:

a first base and a spaced apart second base, each of the first and second bases adapted to be mounted to an upright support surface;

a stationary post connected to the first base;

a cradle pivotally connected to the second base;

a slotted bracket extending from the cradle;

a circuit board received within the slotted bracket;

a light emitting diode mounted to the circuit board;

a pivotal post attached to the cradle to conceal the circuit board, the light emitting diode, and the cradle, and to pivot with the cradle relative to the second base, wherein an egress aperture is formed in the pivotal post to permit the light emitting diode to illuminate an underlying region;

a gasket between the pivotal post and the second base to seal an engagement therebetween and to damp rotation of the pivotal post relative to the second base;

a bar affixed to the pivotal post to pivot with the pivotal post and the cradle, and extending to the stationary post to support a roll of toilet paper between the stationary post and the pivotal post and spaced apart from the upright support surface, the bar having a hollow cavity formed therein;

an abutment projection extending from the stationary post to receive and support the bar; and a pair of axially aligned batteries disposed within the hollow cavity of the bar and in electrical communication with the circuit board to power the light emitting diode.

20. The wall-mount hardware assembly of claim 1 wherein the end cap further comprises:

an electrical contact spring provided in electrical contact with the power source;

an elastomeric ring to provide an interference fit within an opening in the bar to retain the power source within the bar and to maintain electrical contact of the power source with the contact spring.

* * * * *

UNITED STATES PATENT AND TRADEMARK OFFICE
CERTIFICATE OF CORRECTION

| | |
|---|---|
| PATENT NO. | : 11,428,401 B2 |
| APPLICATION NO. | : 16/887377 |
| DATED | : August 30, 2022 |
| INVENTOR(S) | : Neil Edwards |

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Replace drawing sheets 1-3 with drawing sheets 1-3 as shown on the attached page.

Signed and Sealed this
Twenty-eighth Day of February, 2023

Katherine Kelly Vidal
*Director of the United States Patent and Trademark Office*

CERTIFICATE OF CORRECTION (continued)

(12) United States Patent
Edwards (10) Patent No.: US 11,428,401 B2
(45) Date of Patent: Aug. 30, 2022

(54) ILLUMINATED WALL-MOUNT HARDWARE ASSEMBLY

(71) Applicant: LIBERTY HARDWARE MFG. CORP., Winston-Salem, NC (US)

(72) Inventor: Neil Edwards, Kernersville, NC (US)

(73) Assignee: LIBERTY HARDWARE MFG. CORP., Winston-Salem, NC (US)

(*) Notice: Subject to any disclaimer, the term of this patent is extended or adjusted under 35 U.S.C. 154(b) by 130 days.

(21) Appl. No.: 16/887,377

(22) Filed: May 29, 2020

(65) Prior Publication Data

US 2020/0378591 A1 Dec. 3, 2020

Related U.S. Application Data

(60) Provisional application No. 62/855,383, filed on May 31, 2019.

(51) Int. Cl.
| | |
|---|---|
| F21V 33/00 | (2006.01) |
| F21V 23/00 | (2015.01) |
| F21V 23/04 | (2006.01) |
| F21S 9/02 | (2006.01) |
| H05B 47/16 | (2020.01) |
| A47K 10/38 | (2006.01) |
| F21S 8/00 | (2006.01) |
| F21Y 115/10 | (2016.01) |

(52) U.S. Cl.
CPC ............ *F21V 33/004* (2013.01); *A47K 10/38* (2013.01); *F21S 8/036* (2013.01); *F21S 9/02* (2013.01); *F21V 23/009* (2013.01); *F21V 23/04* (2013.01); *H05B 47/16* (2020.01); *F21Y 2115/10* (2016.08)

(58) Field of Classification Search
CPC ...... F21V 33/004; F21V 23/009; F21V 23/04; F21V 23/0464; A47K 10/38; A47K 2010/389; A47K 10/32; A47K 10/16; A47K 10/18; F21S 8/036; F21S 9/02; H05B 47/16; F21Y 2115/10; Y02B 20/40
See application file for complete search history.

(56) References Cited

U.S. PATENT DOCUMENTS

| | | | | |
|---|---|---|---|---|
| 1,778,856 | A * | 10/1930 | Hoegger | A47K 10/22 242/565 |
| D216,458 | S * | 1/1970 | Nestrock | D8/363 |
| 4,367,517 | A * | 1/1983 | Balzer | E04F 11/1804 362/146 |
| 5,450,299 | A | 9/1995 | Lepre | |
| D419,012 | S | 1/2000 | Wiggins, Jr. | |
| 6,135,621 | A * | 10/2000 | Bach | E05B 17/10 16/110.1 |

(Continued)

FOREIGN PATENT DOCUMENTS

| | | |
|---|---|---|
| CN | 202908345 U | 5/2013 |
| CN | 303311737 S | 3/2015 |

(Continued)

*Primary Examiner* — Ko H Chan
(74) *Attorney, Agent, or Firm* — Brooks Kushman P.C.; Lora Graentzdoerffer (57) ABSTRACT

A wall-mount hardware assembly is provided with a base adapted to be mounted to an upright support surface. A post is connected to the base. A lighting assembly is installed in the post to illuminate an underlying region. A bar extends from the post to support an article. A power source is disposed within the bar.

20 Claims, 3 Drawing Sheets